(12) United States Patent
Cree et al.

(10) Patent No.: US 7,568,899 B2
(45) Date of Patent: Aug. 4, 2009

(54) OSCILLATING HAULOFF WITH BEARINGS ALONG CENTRAL AXIS

(75) Inventors: Robert E. Cree, Newark, NY (US); Frank P. F. Luebke, Wiesbaden (DE)

(73) Assignee: Addex, Inc., Stoughton, MA (US)

( * ) Notice: Subject to any disclaimer, the term of this patent is extended or adjusted under 35 U.S.C. 154(b) by 310 days.

(21) Appl. No.: 11/360,035

(22) Filed: Feb. 22, 2006

(65) Prior Publication Data
US 2007/0194502 A1 Aug. 23, 2007

(51) Int. Cl.
*B29C 47/90* (2006.01)
(52) U.S. Cl. .............. 425/72.1; 364/564; 364/565; 364/209.2; 425/326.1; 425/377
(58) Field of Classification Search ........... 425/72.1, 425/377, 326.1; 264/564, 565, 209.2
See application file for complete search history.

(56) References Cited

U.S. PATENT DOCUMENTS

| | | | |
|---|---|---|---|
| 2,844,846 A | 7/1958 | Kronholm | |
| 3,161,942 A | 12/1964 | Cheney | |
| 3,231,651 A | 1/1966 | Cheney | |
| 3,337,107 A | 8/1967 | Catallo et al. | |
| 3,368,949 A | 2/1968 | George | |
| 3,492,693 A | 2/1970 | Clarke et al. | |
| 3,576,935 A | 4/1971 | Dyer et al. | |
| 3,632,265 A | 1/1972 | Upmeier | |
| 3,657,974 A | 4/1972 | Hedrich et al. | |
| 3,684,421 A | 8/1972 | Pilcher | |
| 3,716,322 A | 2/1973 | Kratzert | |
| 3,768,949 A | 10/1973 | Upmeier | |
| 3,804,572 A | 4/1974 | Upmeier | |
| 4,634,358 A | 1/1987 | Dellbrugge | |
| 4,643,656 A | 2/1987 | Karl | |
| 4,650,406 A | 3/1987 | Peters | |
| 4,650,407 A | 3/1987 | Taguchi | |
| 4,676,728 A | 6/1987 | Planeta | |
| 4,682,941 A | 7/1987 | Upmeier et al. | |
| 4,760,627 A | 8/1988 | Schele | |
| 4,836,744 A | 6/1989 | Karl et al. | |
| 5,013,234 A | 5/1991 | Reinhold | |
| 5,106,281 A | 4/1992 | Achelpohl | |
| 5,310,329 A | 5/1994 | Cree | |
| 5,360,328 A | 11/1994 | Cree et al. | |

(Continued)

FOREIGN PATENT DOCUMENTS

EP 0873846 A2 10/1998

OTHER PUBLICATIONS

International Search Report from PCT/US2007/004682, mailed Aug. 29, 2007.

*Primary Examiner*—Robert B Davis
*Assistant Examiner*—Joseph Leyson
(74) *Attorney, Agent, or Firm*—Wilmer Cutler Pickering Hale & Dorr LLP.

(57) ABSTRACT

An oscillating hauloff for blown film has a bearing structure positioned along the vertical process centerline. The bearing structure is separated into upper and lower sections to maintain a clear and open pathway for the web to pass across the process centerline. Passing the web across the process centerline allows the web to change directions before passing over a second turning bar, thus canceling any web wandering introduced by a first turning bar.

22 Claims, 3 Drawing Sheets

U.S. PATENT DOCUMENTS

| | | |
|---|---|---|
| 5,437,544 A | 8/1995 | Achelpohl |
| 5,567,445 A * | 10/1996 | Cree et al. ................ 425/72.1 |
| 5,589,201 A | 12/1996 | Tkach et al. |
| 5,700,488 A * | 12/1997 | Cree et al. ................ 425/72.1 |
| 6,241,502 B1 * | 6/2001 | Baeumer et al. ........... 425/72.1 |
| 6,398,534 B1 | 6/2002 | Faehling |

* cited by examiner

OSCILLATING HAULOFF WITH BEARINGS ALONG CENTRAL AXIS

BACKGROUND

This application relates to an oscillating hauloff device for removing blown film from an extruding apparatus.

An oscillating hauloff receives film from an extruding apparatus and oscillates as the film is received to even out locations where there are variations in the thickness of the film. An oscillating hauloff thus has an oscillating portion for receiving the film, and a stationary portion for receiving the film from the oscillating portion and for providing the film to other equipment, such as a winder.

When blown film is extruded, it is typically is in the form of a bubble. The hauloff has nip rolls that force together the sides of the bubble. As the bubble passes through the nip rolls, there are variations in the thickness of the film. If the film were wound directly onto a roll, thicker areas of the film could increasingly cause some parts of the wound roll to build up faster than others, thus creating hills and valleys in the roll.

Problems can occur when an uneven roll is unwound and provided to converting equipment, such as printing presses, laminators, or bag machines. Uneven rolls considerably reduce the speed of such equipment and also reduce the quality of finished products. The unevenness causes slack in some areas of the film and tightness in other areas, thereby causing creases. On a printing press, ink might not transfer to film inside a crease, so product quality is degraded. Manufacturing processes often have to use spreader rolls or some other means to try to eliminate these creases, but these additional processing steps complicate and slow down the process. Bag machines have several nip rolls for drawing the film into a sealing and/or punching area. When film is drawn through the nip rolls, slack areas cause further creases. If a crease is located where a seal is placed, that seal will be defective.

In general, the better the quality of the roll, the faster one can run downstream equipment and the greater the probability of producing a better quality product.

Several attempts to improve quality have been made using a horizontal oscillating hauloff design. In such a design, the cross direction of the film always lies in a horizontal plane as it passes through and is provided out from the oscillating portion of the hauloff. Examples of such a horizontal design are found in U.S. Pat. Nos. 5,360,328 and 4,634,358, each of which is incorporated herein by reference for all purposes. Early horizontal devices could have stability problems and side-to-side swaying because a single, vertical, small diameter shaft was used for support. Current systems typically employ either single or multiple large diameter thrust bearings which eliminate stability problems and also address problems associated with weight restrictions on suspended nips and prevent collapsing that can occur when using a small shaft.

Another problem in earlier devices was uncontrolled wandering of the film. In typical horizontal designs, there are two turning bars that constantly change angles with respect to the film and work together to allow for a total oscillation of 360°. As with any turning bar, frictional forces cause a slight shift in axial position as the film passes around its diameter, thereby causing the film to wander back and forth with the oscillating motion and wrinkles can form in the film. As a result, although normal variations in the thickness are spread evenly over the surface of the wound roll, wrinkles and creases due to wandering are also wound into the finished roll.

Current horizontal systems address this problem by either actively guiding with the second turning bar or by passively self-canceling the wandering effects by opposing the two turning bars. Unfortunately, active guiding of turning bars disrupts the natural geometry required for wrinkle free operation and can actually induce winkles. The preferred passive "anti-web wandering" horizontal designs require the film to pass through the center of oscillation between the two turning bars to allow the film to approach the second turning bar from the opposite side. To keep the center free of obstruction, multiple fully encompassing rings are used to support the turning bars and idler rolls from the outside as described in U.S. Pat. No. 5,360,328. Recent price increases in raw material steel have made these systems very costly. Other known horizontal designs employ a single, less expensive thrust bearing ring design and require a centralized gearing and support assembly for the turning bars and idlers that prevents passage of the web over center and thus is not used with known passive anti-web wandering technology.

Another design that solves the variable nature of this frictional wandering problem on turning bars is a vertical oscillating hauloff. Examples of such a system are found in U.S. Pat. Nos. 5,727,723 and 4,676,728, each of which is incorporated by reference. In such systems, the oscillating portion turns the film so that it lies on edge in a vertical plane as it is provided from the oscillating portion. A stationary portion then turns the film so that it is provided from the hauloff in a horizontal plane. Typical current vertical oscillating hauloff systems thus employ two turning bars to randomize thickness bands, with the turning bars held at a constant angle to the film thus eliminating changes in frictional effects due to angular shifts in the turning bars common to horizontal designs. The film is first turned on edge and then is sequentially wrapped around several vertically mounted idler rollers (idlers). Once wrapped around the idlers, the unit reverses direction and unwinds the film. This approach is less complex and less expensive than the horizontal design.

The vertical design has other issues. Because the system accumulates and de-accumulates film (i.e., the path length increases and decreases) as the unit rotationally oscillates and the film goes around multiple vertical idlers, the overall speed of the film speed exiting the hauloff slows because some of the speed is taken up by the accumulation, and thus the line speed decreases. When the oscillating portion changes direction, line speed increases. Depending on how fast the oscillating portion is rotating, this change in direction can cause sizable variation in line speeds leading to tension variations, thus causing significant film web wandering, and thereby degrading the quality of the roll of film. This variable web speed problem has been addressed by more recent vertical designs that incorporate film accumulators as provided in U.S. Pat. No. 5,727,723, but such systems are more complex and expensive.

An additional problem with vertical designs occurs during accumulation and de-accumulation. Vertical designs sequentially wrap and un-wrap film around each vertical idler roll. The resistance to the turning of each idler roll creates drag on the film and thus further affects the tension. In this portion of the hauloff where the film travels on end, gravity moves the film as the tension varies, thereby causing tracking problems and wrinkles and hence poorer roll quality or lost trim. If the tension drops too low, wrap-ups can occur in the hauloff causing the extrusion line to shut down. This problem does not occur in horizontal designs since the film is never turned on end.

SUMMARY

The systems described here use a horizontal design oscillating hauloff that incorporates passive self canceling web wander technology in a simple, low cost design, without fully encompassing rings. These systems are comparable to the cost of a vertical design, but without inherent vertical design line speed related tension variations or gravitational web issues. Once the web is flattened, the flattened film passes through the oscillating hauloff in a horizontal orientation rather than a vertical one. Thus, axes along the width of the flattened film are maintained parallel to horizontal as the flattened film travels through the device.

The described systems include an open frame, split support horizontal design oscillating hauloff which implements passive anti-web wander without fully encompassing support rings for oscillating film from an extruding apparatus. The film is provided in a horizontal plane, passing the web between idler rolls across the center of oscillation between turning bars in a manner that the web approaches a second turning bar from an opposite direction from the direction in which the web approaches the first turning bar. This arrangement of idler rolls and turning bars passively cancels the wandering effect of the web as it passes through the oscillating hauloff due to the natural shift in film position equally, but in opposite canceling directions on each of the two turning bars due to friction between the film and each of the two bars without the use of external fully encompassing support rings.

Further, the systems described here are arranged to properly maintain well understood idler and turning bar geometry providing a constant total web path length throughout the oscillating motion, keeping line speed constant and remaining free of gravitation related web conveying issues.

Other features and advantages will become apparent from the following detailed description, the drawings, and the claims.

DETAILED DESCRIPTION

Figure 1:
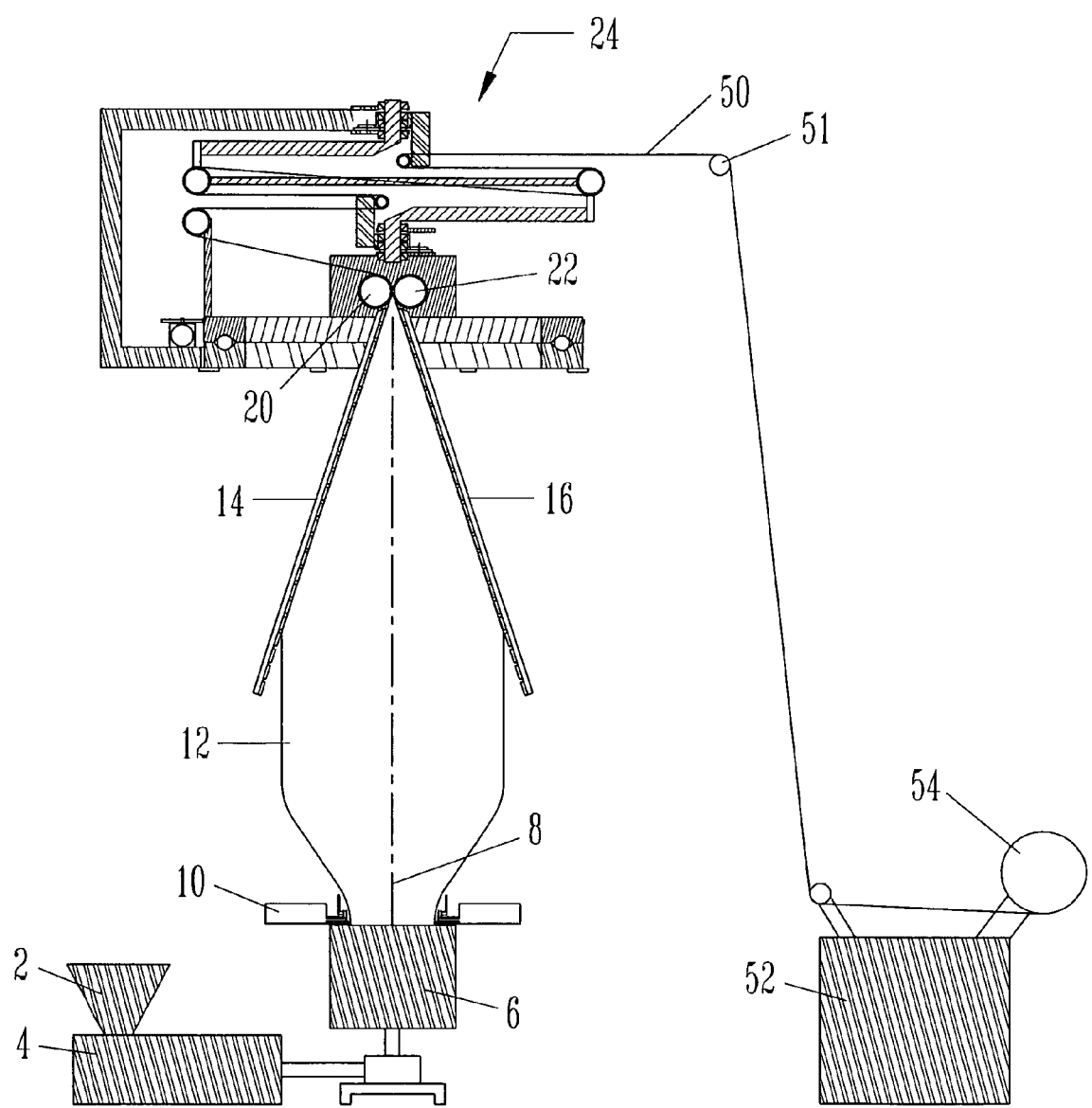
FIG. 1 is a schematic cross section view of an extrusion line and an oscillating hauloff according to one embodiment.

Referring to FIG. 1, plastic resin is provided from resin feeding bin 2 into an extruder 4 where the resin is melted and conveyed. Extruder 4 provides a plastic melt to the bottom of a blown film die 6; the plastic melt exits out of die 6 as an annular plastic melt concentric with a process centerline 8. The melt passes through a cooling ring 10 and forms a continuous cylindrical bubble 12. Bubble 12 is converted from a cylindrical shape to a flat sheet of film as it passes through collapsing shields 14, 16. The film then passes between motorized nip rolls 20, 22, which continually draw the film upwardly.

Collapsing shields 14, 16 and nip rolls 20, 22 are attached to an oscillating portion 24 of a hauloff. As shown in more detail in FIG. 2 and discussed below, oscillating portion 24 oscillates through typically 360° of rotation about a central unit axis parallel to (and often the same as) centerline 8 while receiving the film and maintaining the film's cross direction substantially in the horizontal plane. The film exits the unit as film 50 over a fixed exit idler roll 51. Fixed exit idler roll 51 maintains a fixed angular position about the process centerline 8. Film 50 is conveyed to a winder 52 where it is wound up on a roll 54.

Figure 2:
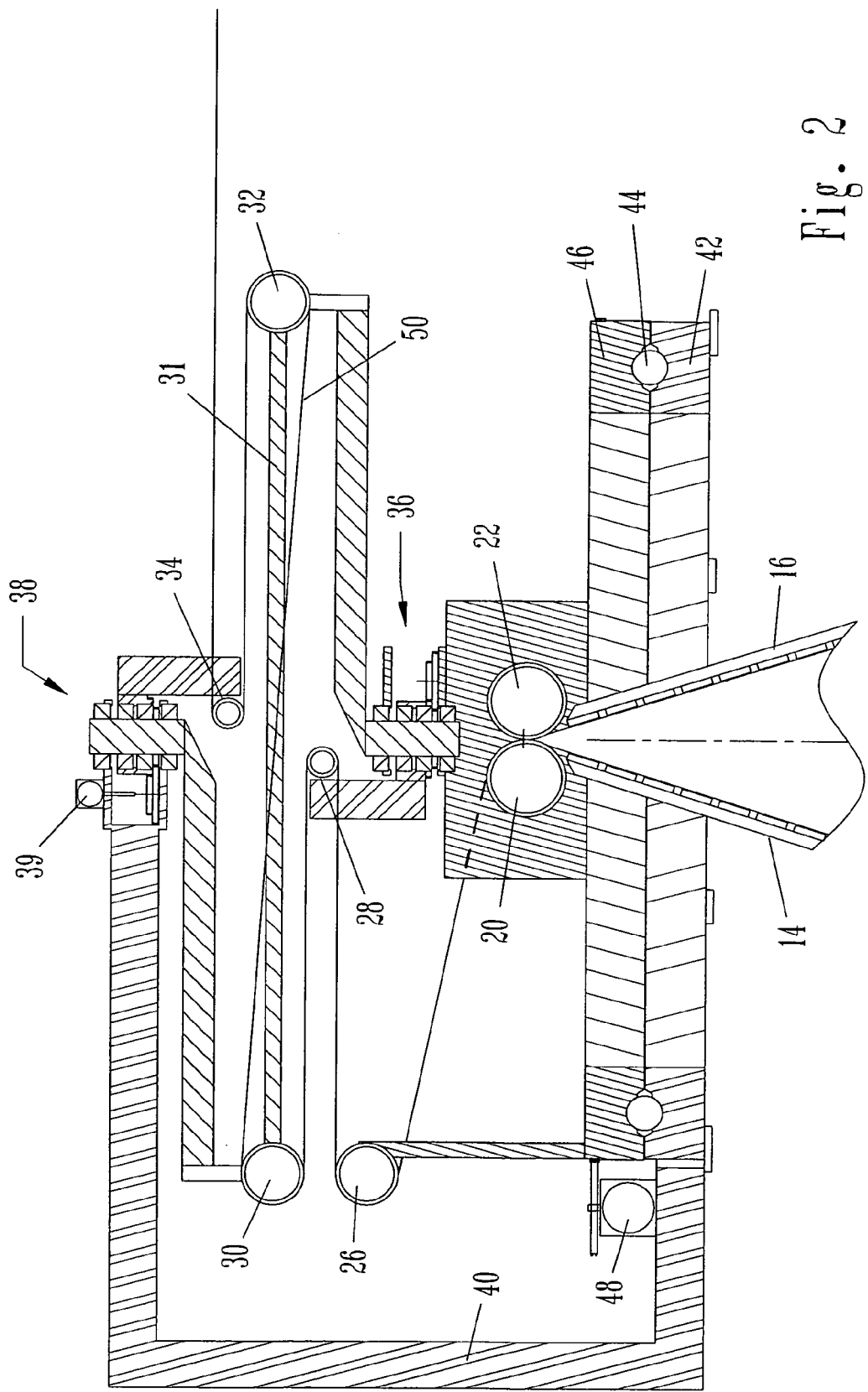
FIG. 2 is a schematic cross section view of the oscillating hauloff of FIG. 1.

Referring now to FIG. 2 which shows the hauloff in more detail, film 50 passes out from between motorized nip rolls 20 and 22 and is conveyed around nip idler roll 26 and then horizontally inwardly to a first turning bar 28 where it wraps 180 degrees and is conveyed horizontally outwardly and around a first intermediate idler roll 30. Film 50 then passes with its cross direction substantially horizontal and through process centerline 8 to wrap around a second intermediate idler roll 32 where it horizontally approaches and wraps around a second turning bar 34 from a direction opposite to the approach to first turning bar 28, thus creating an equal and opposite self canceling effect on web wander caused by the geometry and properties of turning bars 28 and 34 as film 50 passes around them. This effect is known, as shown for example, in U.S. Pat. No. 5,360,328. Film 50 is then conveyed horizontally out of the oscillating unit.

First turning bar 28 and second central idler roll 32 are supported by a lower geared bearing assembly 36 which acts to maintain the angular position of first turning bar 28 midway between the angular positions of nip idler roll 26 and first intermediate idler roll 30. This mid-way angular position ensures the film 50 enters and exits the first turning bar at approximately equal and opposite angles. Collapsing shields 14, 16, motorized nip rolls 20, 22, nip idler roll 26 and lower geared bearing assembly 36 all rotate together as a unit and are attached to a rotating ring 46 which rotates +/−180° about the central vertical process centerline 8 on top of a fixed ring 42 with interspersed ball bearings 44. A motorized drive 48 acts to position rotating ring 46 directly.

To maintain a clear path between first and second intermediate idler rolls 30 and 32 as the path of film 50 crosses the process centerline 8, second turning bar 34 and first intermediate idler roll 30 are separately supported from above by an upper geared bearing assembly 38 which acts to maintain the angular position of second turning bar 34 mid-way between the angular positions of second intermediate idler roll 32 and the fixed angle of exiting film 50. This mid-way angular position ensures the film 50 enters and exits the second turning bar at approximately equal and opposite angles. Upper geared bearing assembly 38 is mounted to fixed frame 40 which may be connected to another fixed structure or directly to fixed ring 42 as shown.

Figure 3:
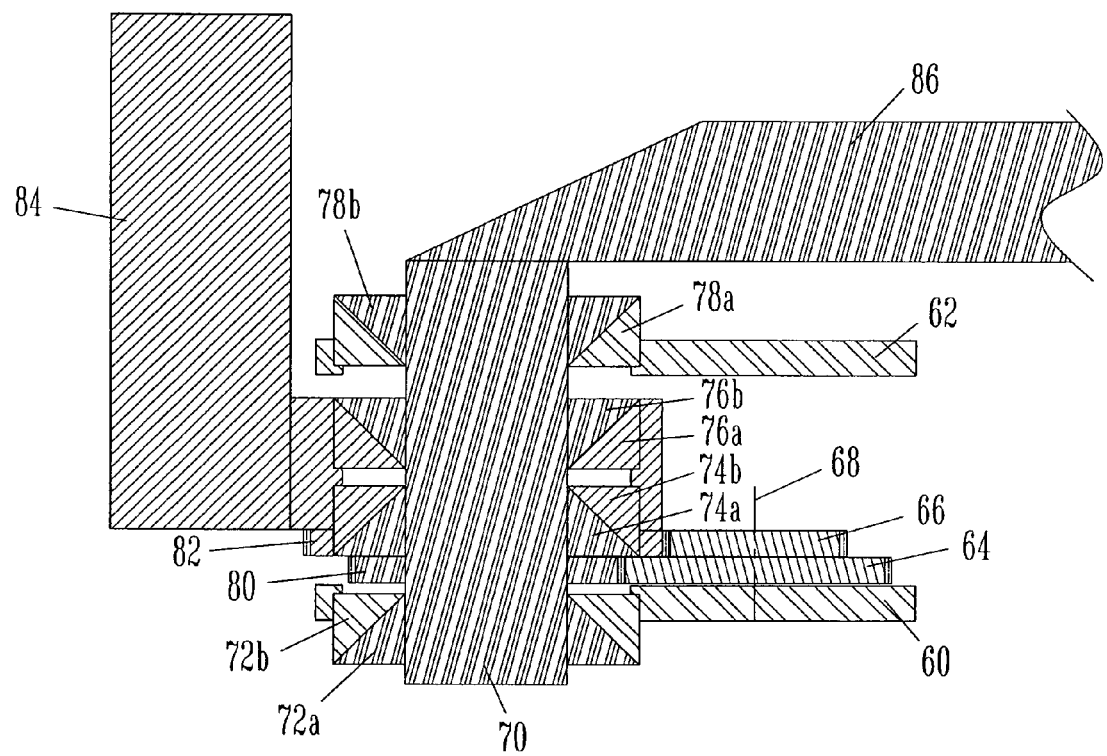
FIG. 3 is a cross section view of a lower geared bearing assembly of FIG. 2.

Although numerous methods can be employed to properly position components, web 50 should enter and exit turning bars 28 and 34 at substantially equal and opposite angles. Web 50 should approach and exit all idler rolls 26, 30 and 32 perpendicular to their respective faces or wrinkles may result. In one embodiment, lower geared bearing assembly 36 and upper geared bearing assembly 38 perform this function and operate similarly as depicted in FIG. 3 in order to gain economic advantage due to common design. For clarity, similar cross-hatching across multiple components depicts those components that turn together as a unit.

As shown in FIG. 3, upper and lower support plates 62 and 60 are rigidly connected and directly support bearing halves 72b and 78a. Mating bearing halves 72a and 78b hold intermediate idler pivot shaft 70 in place while allowing shaft 70 to rotate centrally about the common process centerline 8 shown in FIGS. 1 and 2. Intermediate idler support frame 86, drive gear 80 and bearing halves 74a and 76b are rigidly connected to intermediate idler pivot shaft 70. Mating bearing halves 74b and 76a hold turning bar support frame 84 and turning bar drive gear 82 in place while allowing them to rotate centrally about the common process centerline 8 independent of intermediate idler pivot shaft 70.

Positioning gears 64 and 66 rotate together about a positioning gear axis 68 that is fixed to upper and lower support plates 62 and 60, and offset from process centerline 8. Positioning gear 64 engages central idler drive gear 80, which may be the same size. Positioning gear 66 is ½ the size of and engages turning bar drive gear 82. This gear ratio causes turning bar support frame 84 to rotate at ½ the rate of the rotation of intermediate idler support frame 86 relative to upper and lower support plates 62 and 60. This gear and bearing arrangement ensures accurate positioning of turning bar support frame 84 at an angular position located ½ way between that of upper and lower support plates 62 and 60 and intermediate idler support frame 86.

Referring to FIG. 2, one method to position intermediate idler rolls 30 and 32 is to utilize an upper geared bearing assembly drive 39 and idler end connecting bars 31 (only the rear bar is shown on FIG. 2). Idler end connecting bars 31 rigidly interconnect first and second intermediate idler rolls 30 and 32 and are located outside the edges of film 50 so they do not interfere with the passage of film 50. Thus, the upper geared bearing assembly drive 39 rotation applied to upper gear bearing assembly 38 is translated through connecting bars 31 to lower geared bearing assembly 36. The upper geared bearing assembly drive 39 rotates the intermediate idler rolls 30 and 32 about the vertical process centerline 8 at a rate that is half of the rotation rate of the rotating ring 46.

Idler end connecting bars 31 are not required. If connecting bars 31 are not employed, then upper and lower geared bearing assemblies 38 and 36 could be separately driven by drive connections to motorized drive 48 to maintain first and second intermediate idler rolls 30 and 32 substantially parallel to one another. The upper and lower geared bearing assemblies 36 and 38 may also be driven by drive systems independent from each other as well as independent from motorized drive 48. In either embodiment, intermediate idler rolls 30 and 32 are rotated at a rate that is half the rotation rate of the rotating ring 46.

Referring again to FIG. 1, in some cases, bubble 12 is oriented to extrude vertically downward or sideways. In these cases, simple modifications to fixed and rotating rings 42 and 46 appropriate to the direction of gravity can be made to orient the machine in any direction. The terms "upper" and "lower" are thus used as relative terms and not in an absolute sense.

The present invention has been described in connection with certain structural embodiments and it will be understood that various modifications can be made to the above-described embodiments without departing from the spirit and scope of the invention as defined in the appended claims.

What is claimed is:

1. An oscillating hauloff device for a blown film line, the device having a central axis, comprising:
    a first idler roll;
    a first turning bar;
    an idler roll pair;
    a second turning bar;
    a first gearing mechanism positioned along the central axis which maintains an angular position of the first turning bar midway between an angular position of the first idler roll and an angular position of the idler roll pair; and
    a second gearing mechanism positioned along the central axis which maintains an angular position of the second turning bar midway between an angular position of the idler roll pair and a fixed exit angle of a flattened film;
    the first idler roll, first turning bar, idler roll pair, and second turning bar rotatably moving about the central axis relative to one another;
    one roll of the idler roll pair maintaining an angular position across the central axis from the other roll of the idler roll pair as the idler roll pair rotates about the central axis;
    the flattened film passing between the rolls of the idler roll pair traveling through the central axis; and
    axes along the width of the flattened film being maintained substantially parallel to horizontal as the flattened film travels through the device.

2. The oscillating hauloff device of claim 1, further comprising:
    a pair of nip rollers rotating about axes perpendicular to the central axis and mounted in an assembly that rotatably shifts its angular position about the central axis relative to the first turning bar, idler roll pair, and second turning bar.

3. The oscillating hauloff device of claim 2, wherein the first gearing mechanism is rotatably attached to the assembly.

4. The oscillating hauloff device of claim 2, further comprising a motorized drive connected to the assembly for rotating the pair of nip rollers, first idler roll, first turning bar, idler roll pair, and second turning bar about the central axis.

5. The oscillating hauloff device of claim 2, further comprising a motorized drive comprising:
    a first drive connection for rotating the pair of nip rollers and first idler roll about the central axis;
    a second drive connection for rotating the first turning bar and a first roll of the idler roll pair about the central axis; and
    a third drive connection for rotating the second turning bar and a second roll of the idler roll pair about the central axis.

6. The oscillating hauloff device of claim 2,
    wherein the pair of nip rollers and first idler roll rotate through an angular range of +/−180 degrees;
    wherein the first turning bar rotates through an angular range of +/−135 degrees;
    wherein the idler roll pair rotates through an angular range of +/−90 degrees; and
    wherein the second turning bar rotates through an angular range of +/−45 degrees.

7. The oscillating hauloff device of claim 1, wherein the first idler roll, first turning bar, idler roll pair, and second turning bar rotatably moving about the central axis relative to one another occurs over time in a predetermined manner.

8. The oscillating hauloff device of claim 1, further comprising:
    a fixed roller maintaining a fixed angular position about the central axis.

9. The oscillating hauloff device of claim 1, wherein a lead-in angle of the flattened film on the first turning bar is equal to and opposite of a lead-out angle of the flattened film on the first turning bar.

10. The oscillating hauloff device of claim 1, wherein a lead-in angle of the flattened film on the second turning bar is equal to and opposite of a lead-out angle of the flattened film on the second turning bar.

11. The oscillating hauloff device of claim 1,
    wherein the first turning bar and a first roll of the idler roll pair are rotatably joined to the first gearing mechanism; and wherein the second turning bar and a second roll of the idler roll pair are rotatably joined to the second gearing mechanism.

12. The oscillating hauloff device of claim 11, further comprising:
   a first motorized drive for rotating the first gearing mechanism about the central axis; and
   a second motorized drive for rotating the second gearing mechanism about the central axis.

13. The oscillating hauloff device of claim 11, wherein ends of the rolls of the idler roll pair are rigidly interconnected by end connecting bars, the end connecting bars being positioned to permit the flattened film to pass between the end connecting bars.

14. The oscillating hauloff device of claim 13, further comprising a motorized drive for rotating the idler roll pair about the central axis.

15. An oscillating hauloff device for a blown film line, the device having a central axis, comprising:
   a first rotatable support positioned along the central axis;
   a second rotatable support positioned along the central axis and spaced from the first rotatable support along the central axis; and
   a series of rollers contacting a flattened film, the rollers positioned between the first and second rotatable supports and being supported by at least one of the first and second rotatable supports, the rollers rotating with respect to the central axis, and the series of rollers including at least one turning bar that rotates with respect to the central axis relative to all other rollers of the series;
   wherein the flattened film crosses the central axis at least once as it travels between the series of rollers and after the film has traveled between the turning bar and at least one other roller of the series; and
   wherein axes along the width of the flattened film are maintained substantially parallel to horizontal as the flattened film travels through the device.

16. The oscillating hauloff device of claim 15, the series of rollers comprising:
   a pair of nip rollers rotating about axes perpendicular to the central axis and mounted in an assembly that rotatably moves about the central axis.

17. The oscillating hauloff device of claim 16, wherein the first rotatable support is rotatably attached to the assembly.

18. The oscillating hauloff device of claim 16, further comprising a motorized drive for rotating the series of rollers about the central axis.

19. The oscillating hauloff device of claim 16, further comprising a plurality of motorized drive connections for rotating the series of rollers about the central axis.

20. The oscillating hauloff device of claim 16, further comprising a plurality of motorized drives for rotating the series of rollers about the central axis.

21. The oscillating hauloff device of claim 15, the series of rollers comprising an idler roll pair, wherein ends of the rolls of the idler roll pair are rigidly interconnected by end connecting bars, the end connecting bars being positioned to permit the flattened film to pass between the end connecting bars.

22. The oscillating hauloff device of claim 15, further comprising:
   a fixed roller maintaining a fixed angular position about the central axis.

* * * * *

UNITED STATES PATENT AND TRADEMARK OFFICE
CERTIFICATE OF CORRECTION

PATENT NO. : 7,568,899 B2 Page 1 of 1
APPLICATION NO. : 11/360035
DATED : August 4, 2009
INVENTOR(S) : Cree et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 473 days.

Signed and Sealed this

Seventh Day of September, 2010

David J. Kappos
*Director of the United States Patent and Trademark Office*